United States Patent
Li et al.

(10) Patent No.: US 12,556,654 B2
(45) Date of Patent: Feb. 17, 2026

(54) BODY LANGUAGE ASSISTANT IN VIDEO CONFERENCING

(71) Applicant: Adeia Guides Inc., San Jose, CA (US)

(72) Inventors: Zhiyun Li, Kenmore, WA (US);
Dhananjay Lal, Englewood, CO (US);
Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 53 days.

(21) Appl. No.: 18/103,257

(22) Filed: Jan. 30, 2023

(65) Prior Publication Data

US 2024/0259524 A1  Aug. 1, 2024

(51) Int. Cl.
*H04N 7/15* (2006.01)
*G06V 40/16* (2022.01)
*G06V 40/20* (2022.01)

(52) U.S. Cl.
CPC .............. *H04N 7/15* (2013.01); *G06V 40/174* (2022.01); *G06V 40/20* (2022.01)

(58) Field of Classification Search
CPC ........ H04N 7/15; G06V 40/174; G06V 40/20; G06V 40/16
USPC ...................................... 348/14.08
See application file for complete search history.

(56) References Cited

U.S. PATENT DOCUMENTS

| | | | |
|---|---|---|---|
| 11,290,686 B2 * | 3/2022 | Peters .................. | H04N 7/147 |
| 2016/0350801 A1 * | 12/2016 | Vincent ................. | G06V 40/20 |
| 2024/0022489 A1 | 1/2024 | Kölhi et al. | |

FOREIGN PATENT DOCUMENTS

JP  2012054897  *  3/2012  ............. H04M 3/56

OTHER PUBLICATIONS

"Attendee attention tracking," [retrieved on Apr. 21, 2023 from URL: https://support.zoom.us/hc/en-us/articles/115000538083-Attendee-attention-tracking] (1 page).
"Facial Expression Recognition (FER)," [retrieved on Apr. 21, 2023 from URL: https://paperswithcode.com/task/facial-expression-recognition] (10 pages).
"Full-Body Awareness from Partial Observations" [retrieved on Apr. 21, 2023 from URL: https://crockwell.github.io/partial_humans/] (4 pages).
"Using AI to Remotey Access Mood, Emotions & Mental Health," [retrieved from on Apr. 21, 2023 from URL: https://www.xyonix.com/blog/using-ai-to-remotely-assess-mood-emotions-mental-health] (7 pages).
"Zoom Can Track Who's Not Paying Attention In Your Video Call. Here's How," [retrieved on Apr. 21, 2023 from URL: https://www.huffpost.com/entry/zoom-tracks-not-paying-attention-video-call_1_5e7b96b5c5b6b7d80959ea96] (3 pages).

(Continued)

*Primary Examiner* — Yosef K Laekemariam
(74) *Attorney, Agent, or Firm* — HG Law LLP

(57) ABSTRACT

An assistant receives an impression of a user, the impression including at least an image of the user. The assistant may then receive impression guidelines based on a trained computer model. Using the impression guidelines, the assistant analyzes the impression of the user to determine if the impression of the user is appropriate. The assistant then informs the user at a user device of the outcome of the said analyzing the impression of the user.

20 Claims, 7 Drawing Sheets

(56) References Cited

OTHER PUBLICATIONS

Aviezer et al., "Body Cues, Not Facial Expressions, Discriminate Between Intense Positive and Negative Emotions," Science, 338(6111):1225-1229 (2012) (6 pages).
Calsius, "Using Machine Learning To Analyse Body Language And Facial Expressions," [retrieved Apr. 21, 2023 from URL: https://medium.com/jstack-eu/using-machine-learning-to-analyse-body-language-and-facial-expressions-a779172cc98] (9 pages).
Li et al., "Human Posture Detection Method Based on Wearable Devices," Journal of Healthcare Engineering, 2021:8879061 (2021) (8 pages).
Lian et al., "An Ear Wearable Device System for Facial Emotion Recognition Disorders", Frontiers in Bioengineering and Biotechnology, 9(703048):1-14 (2021).
Liang, "Detecting Emphasised Spoken Words by Considering Them Prosodic Outliers and Taking Advantage of HMM-Based TTS Framework," [retrieved from URL: https://tik-old.ee.ethz.ch/file//2fb7e40861ec1f477391fe533b0b743b/SP2016_paper_130.pdf] (5 pages).
Mahmoud et al., "Interpreting hand-over-face gestures," International Conference on Affective Computing and Intelligent Interaction (8 pages) (2011).
Micilotta et al., "Real-time Upper Body 3D Pose Estimation from a Single Uncalibrated Camera," Eurographics (2005) (5 pages).
Pease, "The Definitive Book of Body Language: The Hidden Meaning Behind People's Gestures and Expressions," [retrieved from Internet URL: https://www.amazon.com/gp/product/0553804723/] (2006) (1 page).
Petty, "Study: Body Posture Affects Confidence In Your Own Thoughts," European Journal of Social Psychology (2009) (5 pages).
Prima et al., "3D Human Pose Estimation of a Partial Body from a Single Image and Its Application in the Detection of Deterioration in Sitting Postures," eTELEMED (2021) (5 pages).
Quiroz et al., "Emotion Recognition Using Smart Watch Sensor Data: Mixed-Design Study", JMIR Ment Health, 5(3): e10153 (2018) (26 pages).
Rodriquez et al., "Robust Vision-Based Hand Tracking using Single Camera for Ubiquitous 3D Gesture Interaction," IEEE Symposium on 3D User Interfaces (3DUI) (2010) (2 pages).
Sears et al., "A comparative assessment of videoconference and face-to-face employment interviews," Management Decision, 51(8):1733-1752 (2 pages) (2013).
Shivakumar et al., "Spoken Language Intent Detection Using Confusion2Vec," Proc. Interspeech, 819-823 (2019).
Sun, "3D Front-View Human Upper Body Pose Estimation Using Single Camera", University of Washington (2013) (88 pages).
Thompson, "Is Nonverbal Communication Numbers Game?," [retrieved on Apr. 14, 2023 from URL: https://www.psychologytoday.com/us/blog/beyond-words/201109/is-nonverbal-communication-numbers-game](4 pages).
Vosoughi, "Deep 3D Human Pose Estimation Under Partial Body Presence," Concordia University (2018) (83 pages).
Zhang et al., "Emphasis Detection for Voice Dialogue Applications Using Multi-channel Convolutional Bidirectional Long Short-Term Memory Network," 11th International Symposium on Chinese Spoken Language Processing (ISCSLP) (2018) (5 pages).

\* cited by examiner

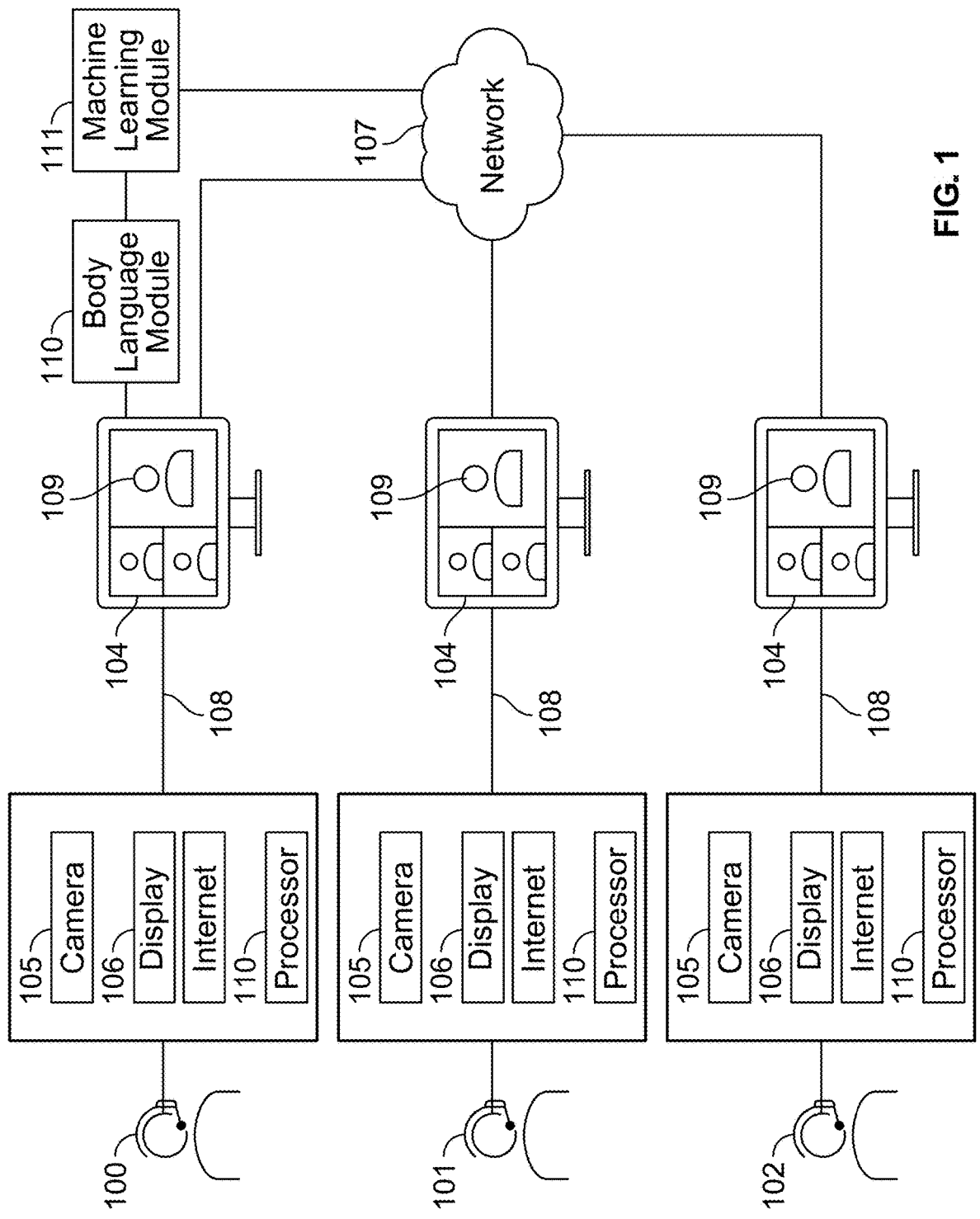

US 12,556,654 B2

BODY LANGUAGE ASSISTANT IN VIDEO CONFERENCING

FIELD

The present disclosure is directed to methods and systems that can monitor a user's body language on a video conference. In particular, the present disclosure includes methods and systems for informing and prompting the user to correct body language in the case of inappropriate body language.

BACKGROUND

Video conferencing or online meeting platforms, such as Zoom, Teams, WebEx, etc., have gained popularity since 2020, especially for business meetings, professional conferences, online instructions, etc. Yet, online meetings often feel less connected than in-person meetings, mostly due to the role body language plays in communication. While online meetings might seem more relaxed, human behavior is not. Behavioral science suggests that the people we are interacting with still evaluate us and make subconscious, snap judgments using the limited body language captured by the camera. This easily causes misunderstandings and distractions and may even drive the meeting in the wrong direction, potentially jeopardizing critical scenarios such as business negotiations.

The importance of a given business meeting makes it imperative to use professional body language during online meetings. However, it is often very difficult, or impossible, for most people to consciously watch themselves during a meeting. Even if they are able to do so, this behavior by itself is inappropriate body language, making things worse.

Fortunately, this has been a well-studied area in social and behavioral science and there are a handful of science-based rules that will help online meetings. For example, body language is far more useful than facial expressions in interpreting a person's emotional state. The camera should see more than just a user's face, ideally it should cover shoulders, arms, and hands. Also, good posture conveys an assertive attitude and confidence. Eyes should look forward to the camera, without staring. Smiling and nodding shows understanding. Arms should not lift above shoulders. Leaning slightly forward emphasizes a point. Knees and toes are invisible, but viewers can tell how a user is sitting even by video and so these body parts should face forward. Body language should also be consistent with other people in the meeting, that is, one should not overreact. This shows a person is listening and understanding. Hand gestures are effective to show passion and emotion. Fidgeting can be distracting and hands should be still when not used. Crossing arms can makes an individual appear unapproachable. Face-touching behaviors can show nervousness, insecurity, incompetence, and even dishonesty.

There is a need for a body language assistant, which detects inappropriate body language through a user's camera and other devices, and suggests professional body language, making corrections automatically when possible.

SUMMARY

According to an aspect there is a method for monitoring body language of a user in a video call comprising: receiving an impression of a user, the impression including at least an image of the user, receiving impression guidelines based on a trained computer model, analyzing the impression of the user using the impression guidelines to determine if the impression of the user is appropriate, and informing the user at a user device of the outcome of the said analyzing the impression of the user.

In this matter, the body language of a user is monitored by a trained machine model trained to identify appropriate body language and the user is notified when his or her body language should be improved.

Additionally, in some embodiments, the method further comprises that the user device is a smartphone. In another embodiment the user device is a smartwatch.

In one embodiment informing the user is in the form of haptic feedback.

In another embodiment, the impression of the user includes an image of the user's face. In some embodiments the impression of the user includes the user's voice.

In some embodiments, the impression guidelines consider the user's role in a video call.

In some embodiments the user is in communication with a second user and the impression guidelines consider the user's relationship with the second user.

In some embodiments, the image of the user is visible to a second user and the impression of the user includes a second image of the user that includes a view beyond what is visible to the second user.

In some embodiments, the method further comprises providing the user with an option to dismiss the said informing and disabling an aspect of the said analyzing the impression of the user upon the user dismissing the said informing.

According to another aspect, there is provided a computer program that, when executed by control circuitry, causes the control circuitry to perform any of the methods discussed above. For example, there may be provided a non-transitory computer-readable medium, in which is stored computer-readable instructions including instructions to receive an impression of a user, the impression including at least an image of the user, instructions to receive impression guidelines based on a trained computer model, instructions to analyze the impression of the user using the impression guidelines to determine if the impression of the user is appropriate, and instructions to inform the user at a user device of the outcome of the said analyzing the impression of the user.

BRIEF DESCRIPTION OF THE DRAWINGS

FIG. 1 shows an example network environment encompassing the present invention;

DETAILED DESCRIPTION

Figure 2A:
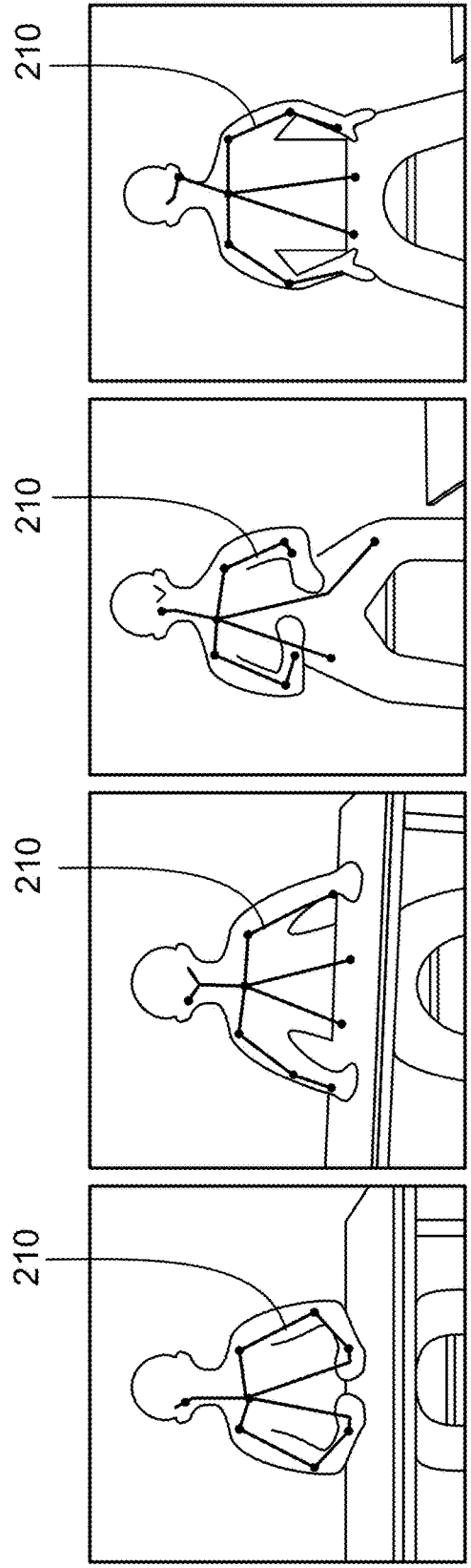
FIGS. 2a and 2b show examples of the body language of a user while participating in an exemplary video conference.

Methods and systems according to the present disclosure allow monitoring of the body language of a video call participant. In the exemplary embodiments set out below, video captured by a user's camera is analyzed to determine whether or not the body language of the user is appropriate for the given video call. The present invention may inform the user if corrections to body language are needed. In other embodiments, such methods and systems may be used to generate artificial images and videos that replace images and videos of the user with negative body language.

FIG. 1 shows an example network environment encompassing the present invention. The user 100 connects to colleagues 101 and 102 using user device 104. User 100 and colleagues 101 and 102 are individuals meeting via a virtual conference such as Zoom, Teams, or similar software installed on their individual devices 104. User device 104 is any device capable of video conferencing such as a smartphone, tablet, or personal computer. User device 104 includes a camera 105 for capturing images and video of user 100 and a display screen 106 for displaying the video conference and other information. User device 104 is connected to network 107 by signal 108 where network 107 is a communication network and signal 108 is a type of network connection such as Wi-Fi or cellular data. User 100 can connect to colleagues 101 and 102 through network 107 which further connects to the user devices 104 of colleagues 101 and 102. Through this connection, user 100 and colleagues 101 and 102 may share a video conference 109. Through video conference 109, an image or video, as well as sound, of user 100 is conveyed to colleagues 101 and 102. This image captures body language including facial expression, posture, and gestures, which in turn transmit communication information to colleagues 101 and 102 beyond the speech of user 100. User device 104 is further connected to body language assistant 110 which may be loaded on the user device 104 in preferred embodiments. The body language assistant is further connected to a machine learning module 111, connected to a network 107.

While participating in conference 109, user 100 conveys body language and body language assistant 110 assesses an impression, that is, a reaction or attitude, of user 100, via an image or video captured by camera 105, for body language having appropriate tone. The present invention will treat facial expressions as part of body language and in a preferred embodiment the image of the user 100 includes the face of the user 100. In preferred embodiments, the impression of user 100 is compared with the tone of video call 109. The tone of video call 109 may be determined by the voices and the body languages of other participants as well as any other relevant information available. If body language assistant 110 finds that the body language of user 100 is not appropriate for conference 109, it will alert user 100. The alert may be in the form of a notification on the display 106, a sound on the user device 104, a haptic notification on a second user device such as a smartphone or smartwatch, or any other notification desired. In the scenario of a second user device, the second user device may be registered with the body language assistant 110 via an app, personal profile, or similar mechanism for example. In embodiments where a user 100 is participating in video call 109 from an in-person meeting room with other users also on the call, user 100 can first be identified by facial recognition or other mechanisms and accordingly images, videos, or analysis of user's 100 body language can be connected to his or her individual account or device 104 for notification or other purposes. In other embodiments, it may be connected to user device 104 through Bluetooth or other connection. User 100 may after receiving the notification adjust his or her body language. The body language assistant 110 may then reevaluate the body language of user 100. In some embodiments, user 100 may dismiss the notification without adjusting body language. In that scenario, the body language assistant 110 will not present again the same notification despite no change.

Figure 2B:
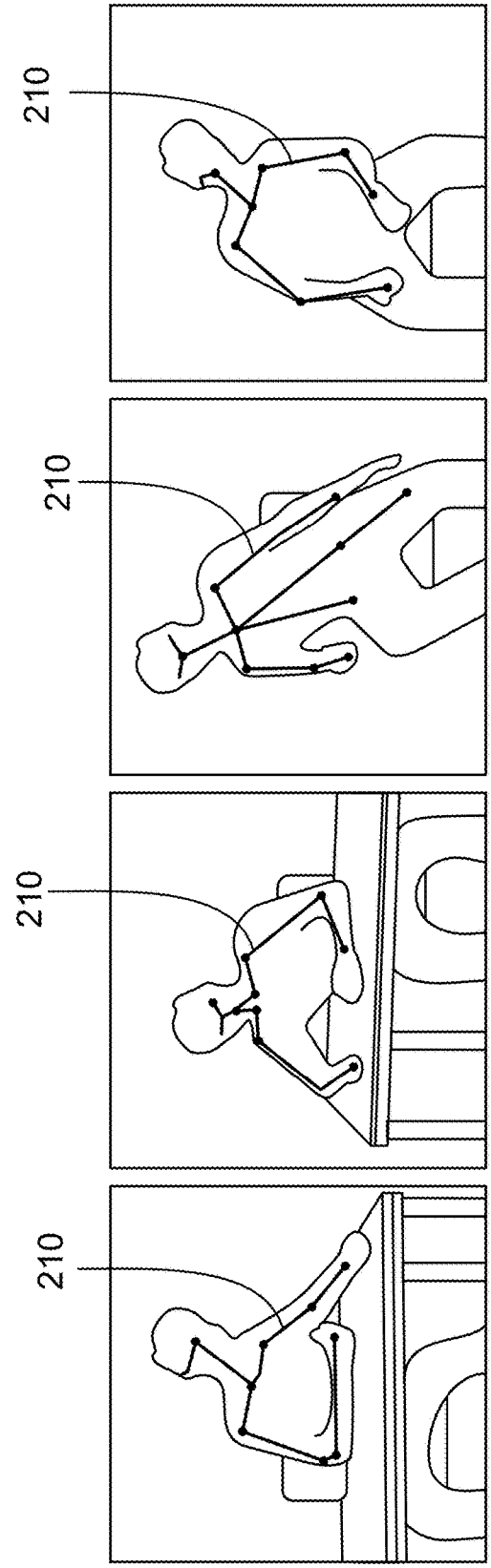

FIGS. 2a and 2b show examples of the body language of user 100 while participating in video conference 109. These images are examples of images that might be captured by a camera while user 100 is participating in a video call 109. These images are captured by camera 105 and assessed either before or during processing by body language assistant 110 via image recognition techniques known in the art. Image recognition techniques may take advantage of depth sensors or cameras in some embodiments. The image recognition techniques may, for example, recreate and outline the structure of the user's 100 posture using image analysis lines 210. Image analysis lines 210 may then assist body language assistant 110 in determining the user's 100 posture and body language. For example, FIG. 2a shows user 100 sitting upright and alert in four different variations. Image analysis lines 210 in all variations show an upright head and an upright trunk. This posture communicates through body language that the user is engaged and interested. The posture and position of FIG. 2a are preferable for professional communications including video calls. Such body language will not create a notification to the user 100 through body language assistant 110 because these are acceptable and preferred postures. In FIG. 2b, the body of user 100 is slouched and slanted in four different poses, as is emphasized by image analysis lines 210, which indicate leaning trunks and slouching heads in each variation. These poses communicate, through body language and subconscious tone, that user 100 is not interested in the conversation. Body language assistant 110 monitors for incorrect body language such as that in FIG. 2b and alerts the user 100 when it occurs.

Figure 3:
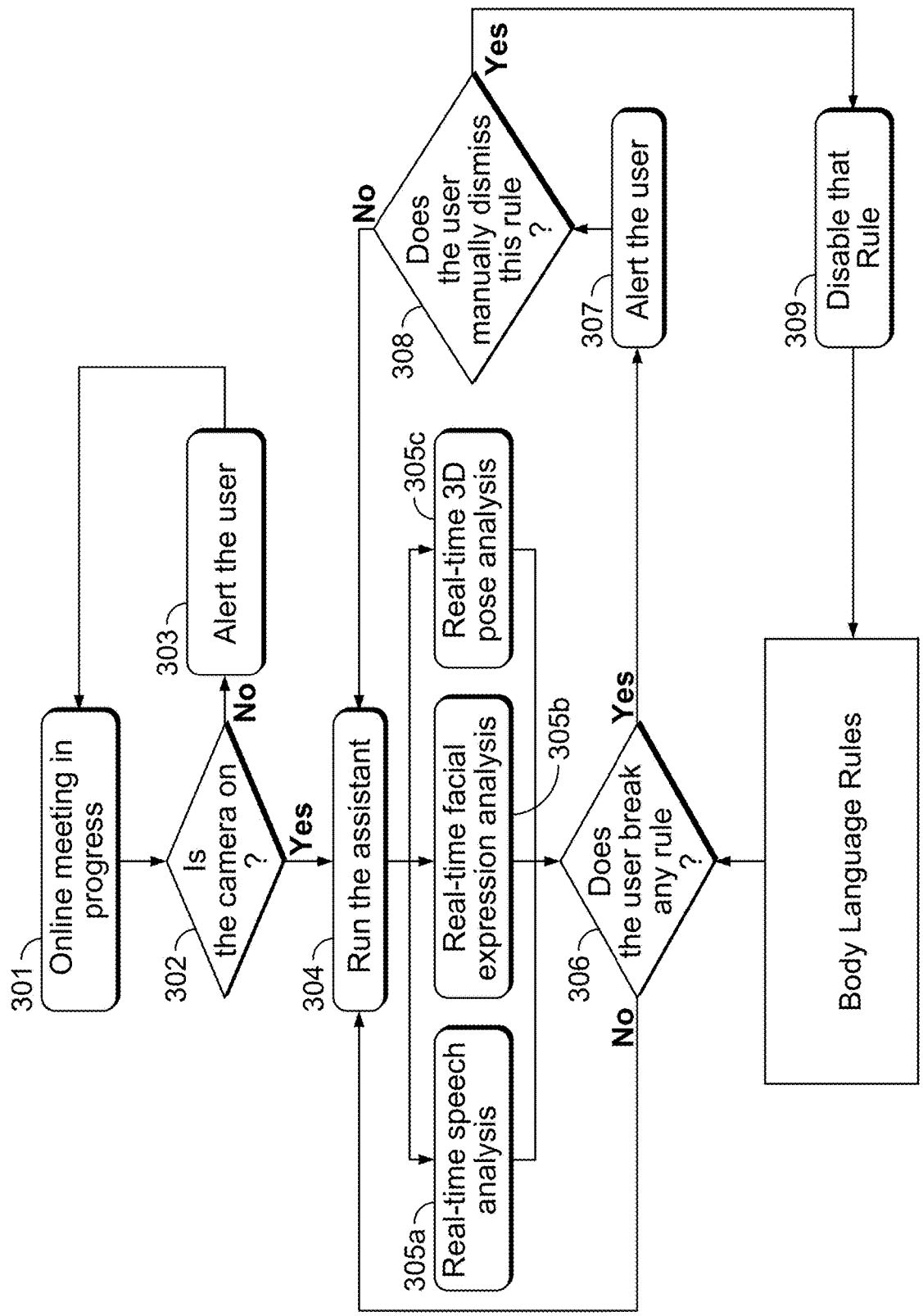
FIG. 3 shows a flow chart illustrating how the present invention directs a user to improve his or her position during a video call.

FIG. 3 shows a flow chart illustrating how the present invention directs a user 100 to improve his or her position during a video call 109 or other professional communication. At step 301 the system determines that an online meeting, such as a video conference 109, is in progress. In some embodiments, the system makes this determination through, for example, a connection to or integration with video conference software. At step 302 the system determines if a user's camera 105 on device 104 is on. In some embodiments, this determination is also made with input from video conference software. In some further embodiments, it is made with information obtained from the operating system, or other technologies, on the user device 104. If the camera is not on, the flow chart goes to step 303 where it alerts the user that the camera is not on. The alert may be in many forms such as notification on display 106. If the system determines that the camera is on, the method turns to step 304 where it runs the body language assistant 110 on device 104. As the assistant 110 runs it collects data from the user which in some embodiments may include image or video, speech, and context of a conference 109. The assistant 110 then analyzes the information performing, for example in preferred embodiments, real-time speech analysis 305a, real-time facial expression analysis 305b, and real-time 3D pose analysis 305c. At this point in some embodiments the body language assistant 110 will also process information regarding the video call 109 and/or other participants in video call 109 to determine the tone of video call 109. This is valuable because what may be appropriate body language in one call may not be appropriate in another. For example, leaning forward might create some slouching for user 100 but at times is appropriate to illustrate a point. In another example a still face is usually preferred in a meeting, however, during good news or a joke, a smile or laugh would be considered more appropriate. Using these analyses, in a preferred embodiment, the body language assistant 110 determines whether or not user 100 has appropriate body language and whether user 100 has broken a body language rule where the body language rules are provided. Example rules include: face, shoulders, arms, and hands are visible; user is sitting up straight; visible arms should not lift about shoulders and should not cross; hands should not touch face or head; eyes should look forward to the camera frequently without staring; facial expression shows full attention to the speaker; hand gestures should match speech; and user leans forward when emphasizing a point. If it is determined that the user 100 has broken a rule, it alerts the user at step 307. In the preferred embodiment, the present invention determines if a rule is broken based on a trained computer model. In other embodiments, a model may be trained based on simply acceptable or unacceptable body language, without the need for specific rules. At step 308 the system offers the user the opportunity to dismiss a broken rule. If the user does not dismiss a broken rule, the system returns to step 304, evaluating the user's presentation again. If the user does dismiss the rule, the system disables that rule at step 309 and returns to step 306 to reevaluate the user's presentation, however this time it does not take the disabled rule into account.

For example, a user 100 as seen in FIG. 2*b* begins a video conference 109. The body language assistant 110 is loaded on the user's 100 user device 104, through which user 100 is participating in video call 109. Body language assistant 110 first determines that camera 105 is on. It then analyzes the body language of user 100. User 100 is slouched and leaning. This posture is visible in images captured from camera 105, the impression of the user 100. The body language assistance 110 performs real-team speech analysis, real-time facial regression analysis, and real-time 3D pose analysis to determine if the user's 100 impression creates an appropriate reaction to the tone of video call 109. The body assistant 110 next compares the user's 100 body language with a set of rules on body language to determine if any rules have been broken. The body language assistant sees that the user 100 is not sitting up straight, thereby breaking a rule. It then informs user 100 through a vibration on user's 100 second user device 104, a smartwatch that has been associated with user's 100 account. The smartwatch at the same time displays a message asking user 100 if he would like to disable the broken rule. User 100 chooses yes by tapping "yes" on the face of the smartwatch. The body language assistant 110 then disables the rule and reevaluates the user 100 continually until the end of video call 109.

Figure 4:
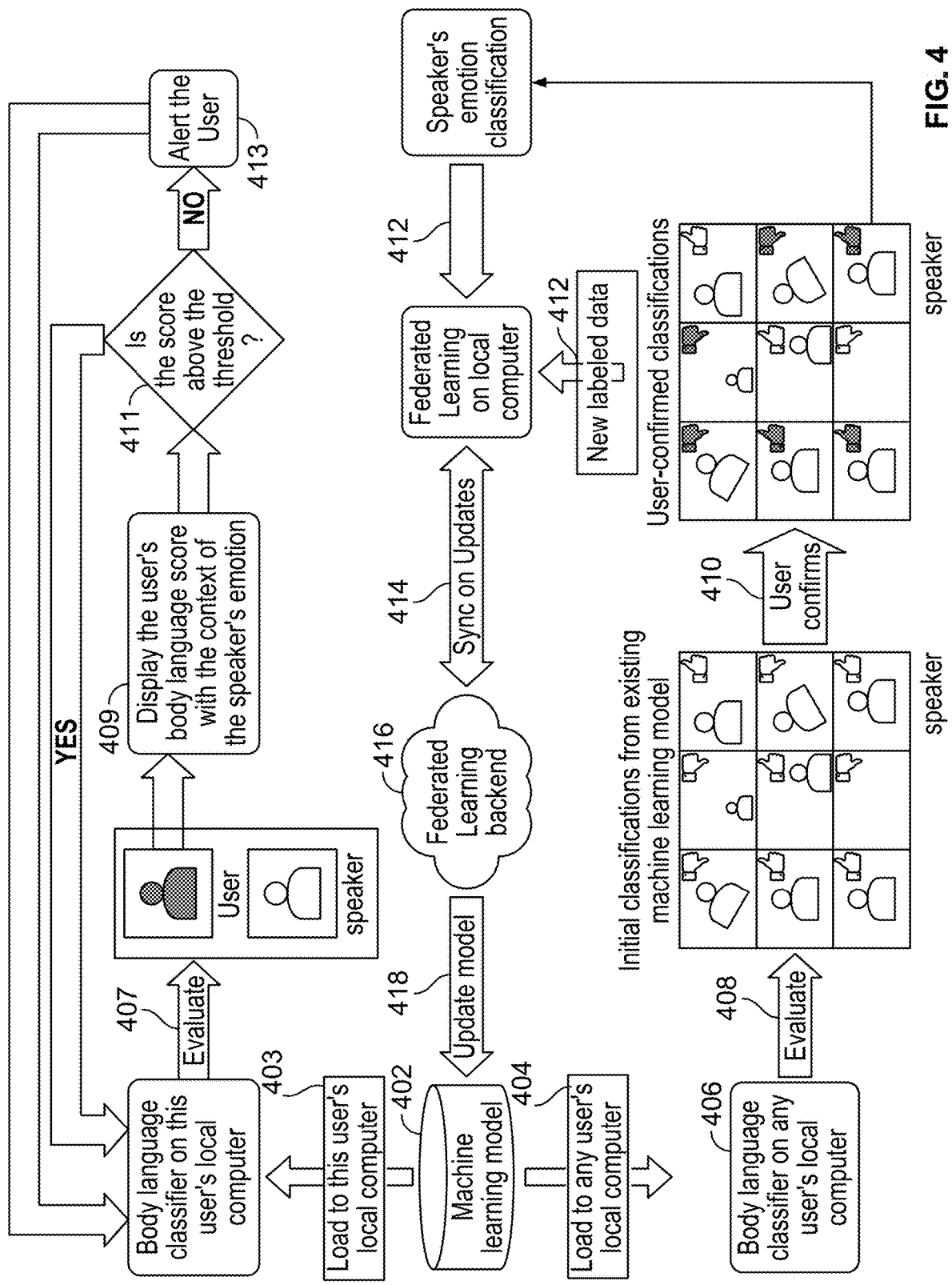
FIG. 4 shows a flow chart illustrating the training of the machine learning module and the implementation of that model in analyzing a user's body language.

In the preferred embodiment, the machine learning model for analyzing body language is trained using crowd-sourced data. In some embodiments, the initial machine learning model can be manually built using the rule-based assistant method, as seen in FIG. 4. Then the model can be updated using crowd-sourced data. In this scenario, evaluators will critique video, images, and/or other information of a sample user's 100 impression in, for example, a sample video conference 109. In some embodiments, the evaluators will be able to manually tag the participants 401 of an online meeting with their evaluations of the user 100. In some embodiments, the assistant 110 will not pinpoint which exact rule the user 100 is violating when the user 100 receives a notification that his or her body language is inappropriate. Instead, it will give the user 100 a continuous score value from 0.0 (the least professional) to 1.0 (the most professional) which reflects the confidence value, or professionalism, of the classification using the model. FIG. 4 shows the details of this process. The method begins at step 402, where a machine learning model is loaded on an evaluator's local computer. At step 404 the body language classifier is accessed on the evaluator's local computer. The evaluator then evaluates users' 100 body language at step 408. The evaluator enters his or her evaluation. In some embodiments the evaluator evaluates the user 100 based on provided role-specific guidelines. For example, if the user 100 is the speaker of the meeting, there may be specific guidelines or standards for that role that do not apply to users 100 who are not speaking. These guidelines might include for example speech intonation and hand gestures complementary to speech. Roles may be, for example, speaker, presenter, listener, or any other role that a user in a video call or other virtual conference might have. An evaluation may also include either confirming or editing the existing classification, if one exists, at step 410. In some embodiments an evaluator may provide feedback that confirms, is positive, is negative, or is unsure of an existing classification. For example in the embodiment seen in FIG. 4, evaluators may choose "thumb up" on users 100 who use professional body language and "thumb down" on those who do not. When confirming a thumbs up or down, the evaluator may click on those icons, highlighting and confirming them. Data regarding the evaluators' determinations are sent to the model on the local computer at step 412. "Federated learning" techniques can be used here to protect each participant's privacy, by which only the learned model and updates, not personal data, are sent across the internet 107. Then, when the body language assistant 110 is called, for example at step 304 in FIG. 3, the body language assistant 110 on a user's computer 104 can load the updated model and constantly evaluate the user's body language without transmitting personal data. The tagged data can be processed asynchronously by an evaluator's local computer. At step 414 the local computer syncs with the machine learning model 111, sending the new data to the federated learning backend 416. At step 418 the machine learning model 111 is updated with the new data. It is then continually updated, to be continuously improved with crowd-sourced feedback.

The machine learning model is then used to analyze a new user's 100 body language. At step 403 the body language module 110 based on the machine learning model 111 is loaded onto a user's local computer 104. The body language classifier 110 evaluates the user's 100 body language using the machine learning model 111 at step 407. The body language classifier 110 may judge a user's 100 body language based on the user's 100 role. For example, evaluating the speaker might use different criteria than analyzing a listener. In one example a speaker might be evaluated based primarily on the tone of voice and facial expression while a listener's body language might be based on posture and eye contact. In some embodiments, the speaker's voice, face, and gesture are used to classify his or her intentions and emotions and this data is fed into the federated learning process. The speaker's, and in some embodiments the listeners', body language may then be evaluated to determine whether or not it matches the speaker's determined intentions. Therefore, the machine learning model will be able to evaluate the user's 100 body language with the context of the speaker's intention and emotion when the user 100 is the speaker or the listener. If the user 100 is the speaker the body language classifier 110 can disregard listeners and only evaluate the speaker's body language using the speaker's detected emotion. This will be useful if the speaker does not adjust his or her body language according to listeners' reactions, such as in webinars. Alternatively it may in other embodiments include analysis of listeners' videos if their body language can be classified with high confidence. This will be useful in situations where the speaker's body language should respond to listeners' body languages, such as in online teaching. The user's 100 role may be automatically detected. Similarly, the correct analysis algorithm may be automatically chosen.

At step 409 a score, or other indication, representing the analysis of the user's 100 body language is displayed. At step 411 it is determined if the score is above a given threshold. If it is, the method returns to step 407 and continues to evaluate the user's 100 body language. The method may return to step 407 continually throughout the meeting 109 to constantly monitor body language in some embodiments. If the score is not above the threshold, the method alerts the user 100 at step 413. This alert may be displayed on the user's screen 106, or on other user devices such as a smartphone or smartwatch. These other devices may be linked to a user's 100 profile or the body language assistant 110. In other embodiments the indicator or score is communicated to the user 100 in another matter such as haptic feedback or a preselected sound. The alert informs the user 100 that his or her body language should be adjusted. That is, a user 100 is participating in a video conference when he begins to lean to one side. This posture appears unprofessional to the other participants. The body language assistant 110 notices the user's 100 change in posture and alerts the user 100 by, for example, a pop-up on his video or a vibration on his smart watch. After the method has alerted the user 100, the method returns to step 407 to continue to monitor the user's body language.

In most video conference scenarios, only a user's 100 face and shoulders are visible to the camera. To have a better view of body language, the camera can in some embodiments of the present invention periodically zoom out to capture more of the body and more of the user's 100 body language. In preferred embodiments, the zoom-out video is only used by the body language assistant 110, and not shared with other video conference participants, so others will not notice any zoom level change. During the zoom-out, the captured video can be cropped to match the normal zoom level and be streamed. Alternatively using techniques described in U.S. patent application Ser. No. 17/864,517, filed Jul. 14, 2022, herein incorporated by reference, deepfake and human image synthesis can be used to enable networks and real-time streaming services to automatically synthesize and replace degraded video content to ensure uninterrupted delivery and high-quality communications from and between every participant.

In some scenarios multiple video conference participants meet in-person in one meeting room, such as when an in-person meeting is recorded or if there are multiple people in one office on the same video conference. In these scenarios, there is usually one single camera in the meeting room to capture all people in meeting 109. Some meeting platforms, such as Zoom, can automatically segment, and identify each participant.

However, in these scenarios, participants are less likely to constantly watch their own laptops. In this case, the body language classifier 110 can still apply to each participant by recognizing each individual using image recognition. The images of each user are then analyzed independently of one another and each user receives personal feedback via their registered devices, such as mobile phones, smartwatches, and other wearables, etc. The user's 100 registered profile picture can be used, also by image recognition and facial recognition software, to match the body language assistant 110 to a specific user 100, thus linking a target device. Feedback can be in the form of text, sound or haptic feedbacks with different patterns or intensities. For example, tapping haptic feedback from short to longer intervals may indicate to the user 100 that he is talking too fast, and needs to slow down.

Figure 5:
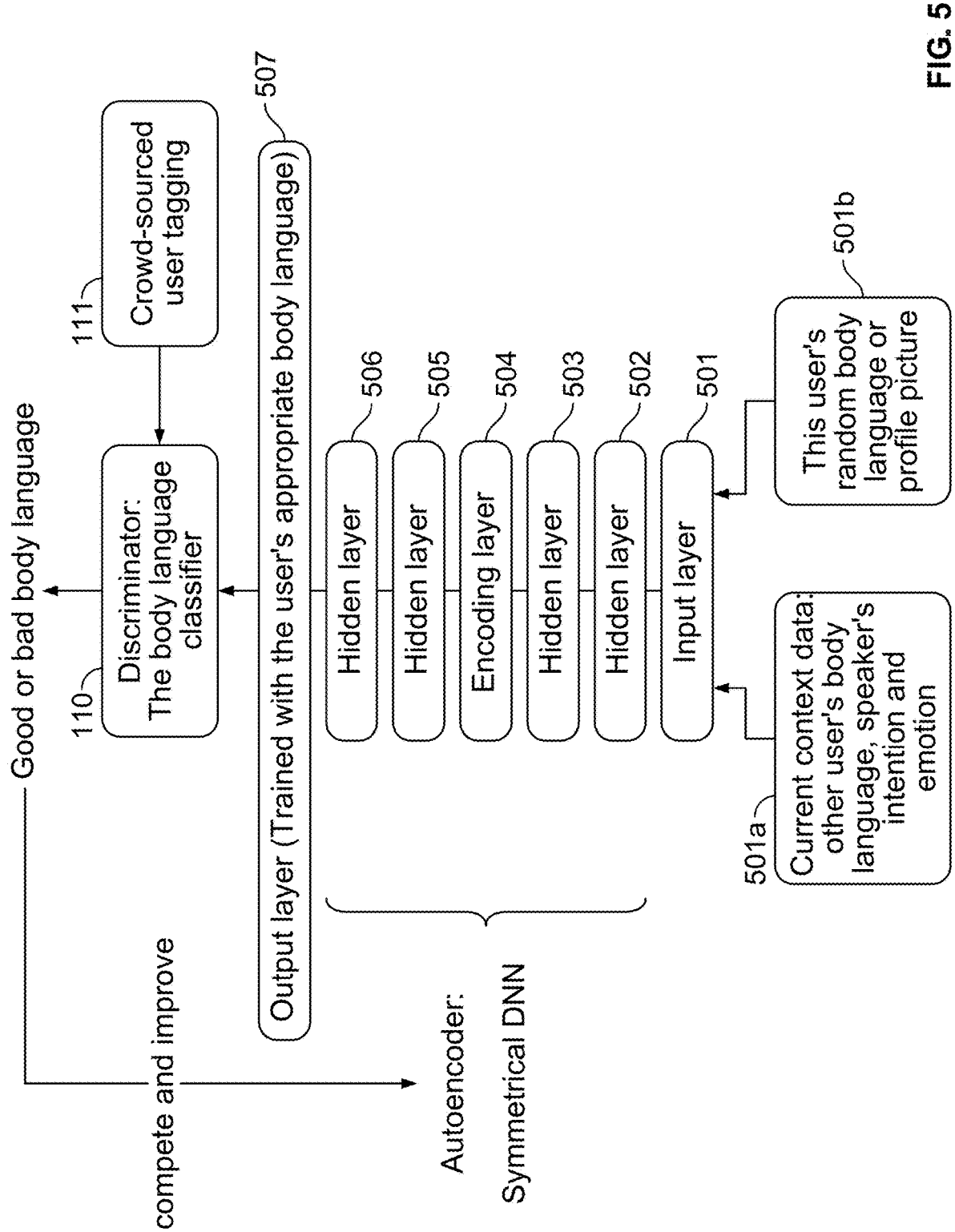
FIG. 5 shows an architecture of a modified autoencoder integrated with generative adversarial networks (GANs)

In some embodiments, the present invention may generate images or video using autoencoders and generative adversarial networks (GANs). Such techniques are described in U.S. patent application Ser. No. 17/864,517, filed Jul. 14, 2022, herein incorporated by reference. Deepfake and human image synthesis can be used to enable networks and real-time streaming services to automatically synthesize and replace undesirable video content to ensure uninterrupted delivery and high-quality communications from and between every participant. For example, undesirable content may be that of low resolution, visibility, or one where the user 100 displays an inappropriate impression. FIG. 5 shows an architecture of a modified autoencoder integrated with a GAN. At the first layer 501 is input, coming from context data, 501*a*, and an image of the user 100 which may be any body language or profile picture, 501*b*. The autoencoder is then made of symmetric layers below and above the encoding layer. For example, in a typical five-layer autoencoder, there will be, hidden layer 502, hidden layer 503, encoding layer 504, hidden layer 505, and hidden layer 506. Finally, is the output layer 507, which is the generated image or video. This layer is generated by a machine learning model trained with appropriate body language. Output layer 507 is also subject to the discriminator, or body language assistant 110, which classifies the images and body language of that layer using the crowd-sourced user tagging of machine learning 111.

This modified autoencoder takes the current context data, such as other users' body language, a speaker's intention, and participants' emotions, together with random body language from the user 100 to generate a new image. Alternatively, the system can simply use this user's 100 profile picture or other image as the input. To train the model to generate appropriate body language for the user 100, it in some embodiments uses the tagged appropriate body language of this user 100 as the output where appropriate body language can be predefined by, for example, the rules discussed in the context of FIG. 3. Once trained, this model can take any user's random body language or picture, and given the context data, generate an appropriate body language image/video to replace inappropriate images such as images or videos where the user's 100 body language is slouching, unprofessional, or similar to poses shown in FIG. 2*b*. To keep improving, this autoencoder is further integrated with a modified GAN, where the difference between a regular GAN and a modified GAN is that instead of using tagged appropriate body language, which was already used in training the autoencoder, the discriminator 110 uses crowd-sourced user tagging as its input. The output of the discriminator 110 will be used to guide the further adjustment of the autoencoder, thus in turn improving the quality of the generated body language image/video. Once trained, this model is subject agnostic, meaning that it can be applied to any user 100.

In some embodiments, the autoencoder may generate images or video that replace inappropriate body language. For example, if the body language assistant 110 determines that a user 100 is not portraying appropriate body language, like those in FIG. 2*b*, the body language assistant may use the autoencoder to generate images or video that shows user 100 with appropriate body language, such as those in FIG. 2a, and replace the images of user 100 captured through camera 105 with the generated images so that the colleagues 101 and 102 viewing user 100 on video call 109 interpret user 100 as portraying appropriate body language. Generated videos may match audio collected from user 100 or may be generated, or altered from original speech, to match the context of the call. The body language assistant 110 may automatically replace images or video or may do so only after user approval.

Figure 6:
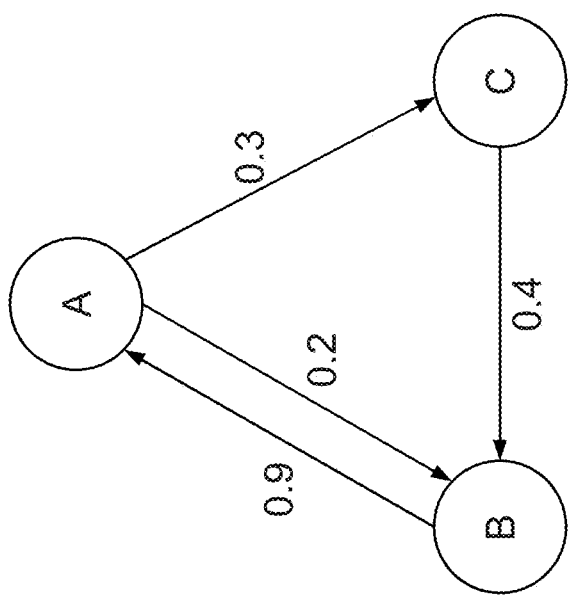
FIG. 6 shows connections between two users and a formula for calculating the strength of said connection.

The body language assistant will be the most useful in a formal meeting with unfamiliar people because formal meetings have higher expectations for professional body language and the subconscious communication conveyed through body language has the most impact on unfamiliar people. Therefore, the sensitivity of the body language assistant 110 will adjust according to the participants in preferred embodiments. That is, in these embodiments, casual meetings with colleagues a user speaks to everyday and is friendly with will have a different standard for body language than a formal meeting with people the user does not know well. To adapt the body language assistant's 110 sensitivity to the tone of the meeting, the present invention in some embodiments determines the connection of the user to the other participants in the meeting. In doing so, it may first track the strength, S, of one connection from A, a first individual, to B, a second individual, as the amount of time they spend in the same meetings divided by the total time A spends in all meetings. This calculation is shown in FIG. 6. Similarly, as seen in FIG. 6, the connections between A and C, a third individual, can also be calculated in additional to that between C and B. Any of the discussed connections can further be calculated in the inverse direction, i.e., B to A. In some embodiments the calculations shown in FIG. 6 can be initialized using the company's organizational chart, for example. In this example, the organizational chart might show for example that company executive teams usually don't have the same meetings as engineers, but people in the same team will have frequent meetings together and therefore people on the same teams will have strong connections with one another.

In some embodiments, a sliding time window, e.g., 3 months, can be used to update the graph such that the connection between two or more people is determined based on a set amount of time, e.g., 3 months, before the calculation date. In some embodiments, if the same group of people have a lot of regular meetings, then the connection between those people will be stronger over time and that strength will be reflected in the calculations. In some embodiments, if a group of people do not have regular meetings, the strength of their connection will decrease.

In some embodiments, if the determined connection is stronger, the sensitivity of the body language assistant will gradually decrease since people become more familiar with each other and body language no longer plays an important role in communication or causes any misunderstanding.

In some embodiments, if there are not at least some participants in a meeting that are not strongly connected with others in the meeting, then the body language assistant will act in normal or default mode. In some embodiments the normal or default mode is high sensitivity.

Figure 7:
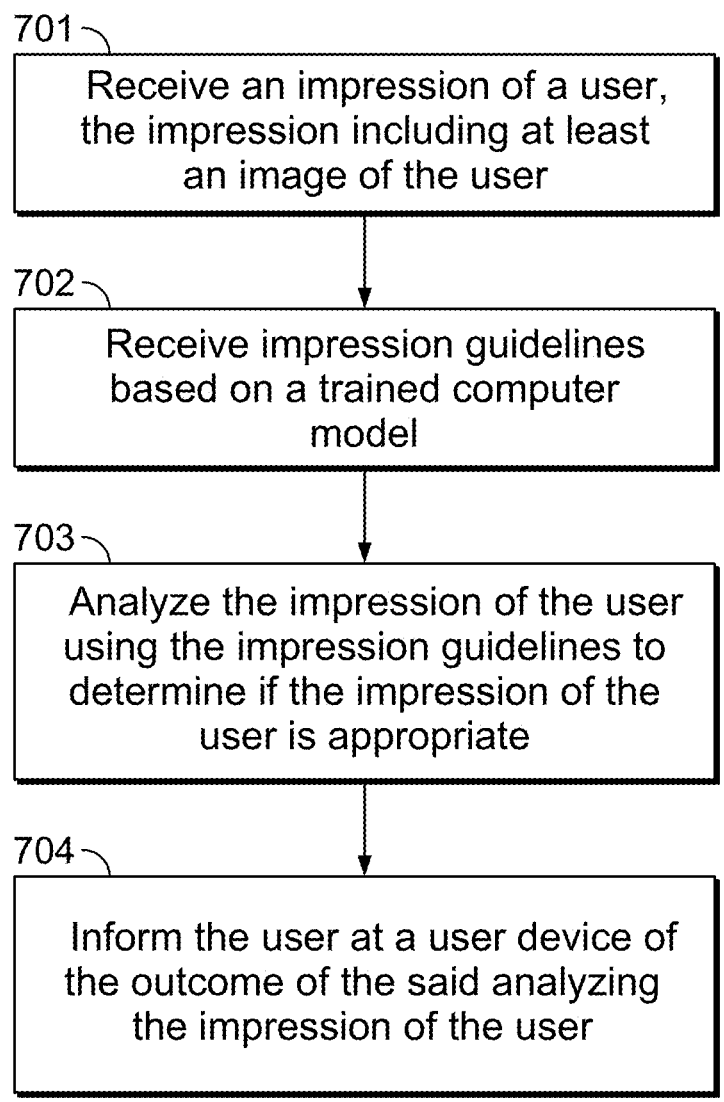
FIG. 7 shows a flow chart of an exemplary method of they system shown in FIG. 1.

FIG. 7 depicts a method for implementing the present invention. The method comprises at step 701 the body language assistant 110 receiving an impression of a user 100, where the impression includes at least an image of the user 100. Next, at step 702 the body language assistant receives guidelines of impressions based on a trained computer model 111. The trained computer model 111 is connected to or integrated with body language assistant 110. At step 703 the body language assistant 110 analyzes the impression of the user 100 using the impression guideless to determine if the impression of the user 100 is appropriate. Appropriate body language is that of, for example, FIG. 2. Then, at step 704, the body language assistant informs the user 100 at a user device 104 of the outcome of the said analyzing the impression.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The invention claimed is:

1. A method for monitoring body language of a user in a video call comprising:
   receiving an impression of a user, the impression including at least an image of the user;
   receiving impression guidelines based on a trained computer model;
   analyzing the impression of the user based at least in part on the impression guidelines to determine that the impression of the user is inappropriate; and
   in response to determining that the impression of the user is inappropriate:
      causing a notification to be sent to a user device of the user, the notification indicating that the impression of the user is inappropriate without changing a display of the video call.

2. The method of claim 1, wherein the user device is a smartphone.

3. The method of claim 1, wherein the user device is a smartwatch.

4. The method of claim 1, wherein the notification is in a form of haptic feedback.

5. The method of claim 1, wherein the impression of the user includes a facial image of the user.

6. The method of claim 1, wherein the impression of the user includes a voice of the user.

7. The method of claim 1, wherein the impression guidelines consider a role of the user in the video call.

8. The method of claim 1, wherein the user is a first user and in the video call with a second user, the method further comprising:
   determining a relationship between the first user and the second user; and
   in response to determining the relationship between the first user and second user;
      updating the impression guidelines to include the relationship.

9. The method of claim 1, wherein the image of the user is visible to a second user and the impression of the user includes a second image of the user that includes a view beyond what is visible to the second user.

10. The method of claim 1, wherein the notification further comprises an option to deny that the impression of the user is inappropriate.

11. A system for monitoring body language of a user in a video call, the system comprising:
   input circuitry configured to:
      receive an impression of a user, the impression including at least an image of the user; and
      receive impression guidelines based on a trained computer model; and
   control circuitry configured to:
      analyze the impression of the user based at least in part on the impression guidelines to determine that the impression of the user is inappropriate; and
      in response to determining that the impression of the user is inappropriate:
         cause a notification to be sent to a user device of the user, the notification indicating that the impression of the user is inappropriate without changing a display of the video call.

12. The system of claim 11, wherein the user device is a smartphone.

13. The system of claim 11, wherein the user device is a smartwatch.

14. The system of claim 11, wherein the notification is in a form of haptic feedback.

15. The system of claim 11, wherein the impression of the user includes a facial image of the user.

16. The system of claim 11, wherein the impression of the user includes a voice of the user.

17. The system of claim 11, wherein the impression guidelines consider a role of the user in the video call.

18. The system of claim 11, wherein the user is a first user and in the video call with a second user, the control circuitry is further configured to:
   determine a relationship between the first user and the second user; and
   in response to determining the relationship between the first user and second user;
      update the impression guidelines to include the relationship.

19. The system of claim 11, wherein the image of the user is visible to a second user and the impression of the user includes a second image of the user that includes a view beyond what is visible to the second user.

20. The system of claim 11, wherein the control circuitry is further configured to display an option to deny that the impression of the user is inappropriate.

* * * * *